(12) United States Patent
Fortuna (10) Patent No.: US 6,778,833 B1
(45) Date of Patent: Aug. 17, 2004

(54) METHOD FOR ALLOCATING IDENTIFIERS IN A CELLULAR WIRELESS NETWORK

(75) Inventor: Frederick Fortuna, San Diego, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 786 days.

(21) Appl. No.: 09/711,439

(22) Filed: Nov. 13, 2000

(51) Int. Cl.[7] .......................... H04B 7/216; H04Q 7/36
(52) U.S. Cl. .................. 455/446; 455/453; 455/422.1; 455/500; 455/512; 370/335; 370/342
(58) Field of Search ................................ 455/446, 444, 455/445, 435.2, 428, 422.1, 423, 424, 500–502, 512–513, 515–516, 524–525, 560–561, 453; 370/335, 342, 332, 333

(56) References Cited

U.S. PATENT DOCUMENTS 5,497,424 A * 3/1996 Vanderpool .............. 455/422.1
6,567,665 B1 * 5/2003 Kissee ..................... 455/453
2001/0008523 A1 * 7/2001 Song ....................... 370/335
2004/0029573 A1 * 2/2004 Kim ........................ 455/415

FOREIGN PATENT DOCUMENTS

KR 1107629 A2 * 6/2001 ............ H04Q/7/36

* cited by examiner

Primary Examiner—Erika Gary
Assistant Examiner—Kamran Afshar (57) ABSTRACT

A method for allocating identifiers in a cellular wireless network. The method may determine the optimal distribution of identifiers, such as pseudo-random offset numbers, to the sectors and cells of a Code Division Multiple Access cellular wireless system. The method may ensure that those identifiers that are used more than once by the system are allocated to sectors that are as far apart as possible. The method allocates identifiers preferentially to sectors in more tightly packed regions of the network. Then the method determines how widely spread the identifiers are. Sectors with identifiers that are near each other are then preferentially reallocated their identifiers. The method repeats determining the spread of identifiers and reallocating the identifiers until the sectors retain the same identifiers, thereby reflecting a stable allocation of identifiers in the cellular wireless system.

19 Claims, 6 Drawing Sheets

METHOD FOR ALLOCATING IDENTIFIERS IN A CELLULAR WIRELESS NETWORK

COMPUTER PROGRAM LISTING APPENDIX

This application contains a computer program listing appendix on a compact disc, which is fully incorporated herein by reference. The compact disc contains a single file named "Appendix.txt" of size 36,352 bytes created on Nov. 10, 2000.

COPYRIGHT

A portion of this disclosure of this patent document contains material that is subject to copyright protection. The copyright owner has no objection to the facsimile reproduction by anyone of the patent disclosure, as it appears in the Patent and Trademark Office patent files or records, but otherwise reserves all United States and International copyright rights whatsoever.

FIELD OF INVENTION

The present invention relates to assigning identifiers in cellular wireless networks. More specifically, it relates to a method for assigning pseudo-random offset numbers to the sectors of a code division multiple access wireless system so as to minimize the interference between base stations.

BACKGROUND OF THE INVENTION

Cellular wireless is an increasingly popular means of personal communication in the modern world. People are using cellular wireless networks for the exchange of voice and data over cellular telephones, Personal Digital Assistants ("PADs"), cellular telephone modems, and other devices. In principle, a user can seek information over the Internet or call anyone over a Public Switched Telephone Network ("PSTN") from any place inside the coverage area of the cellular wireless network.

A typical cellular wireless network is divided into cells, each providing wireless service to a particular area of terrain within the coverage area of the network. Each of the cells has a base station with a radio transceiver that communicates with mobile stations within the cell. Where to place a cell's base station is a function of the expected capacity of calls within the cell. Additionally, the signal power of the base station may depend on the proximity of other base stations. Cell sizes may therefore vary considerably.

The effective coverage area of any cell depends on many factors influencing propagation. Such factors include antenna height, cell topography, geography, and clutter. For example, one cell may cover a large area because it has an antenna on a tall building while another cell may cover only a small area because signals from the base station have to navigate several intervening buildings. Other cells may cover long sections of a highway. To increase the number of mobile stations that can transmit simultaneously within any cell, i.e. increase the capacity of the system, each cell may be further divided into sectors. If a cell is divided into sectors, the division is typically into three sectors, each sector providing an approximately 120-degree coverage of the cell. To avoid ambiguities when handing off to another cell, a mobile station must communicate with only one sector at any point in the cellular wireless network. Therefore each sector must uniquely identify itself to any mobile station at any given point in the network.

As is familiar to those of ordinary skill in the art, in the Advanced Mobile Phone System ("AMPS"), a dominant cellular telephone system of the last century, each sector transmits on a unique group of frequencies. In AMPS, each mobile station within the coverage area of the sector communicates with the base station on only one of these frequencies in the group. By transmitting on different frequencies, the communications from two mobile stations do not interfere with each other. AMPS, however, has two important drawbacks. One drawback is that it has limited capacity because there is a finite number of available frequencies that have to be distributed among the sectors of the AMPS network without neighboring cells sharing a common frequency. Another drawback is inefficient use of the channel defined by each frequency, because the communication typically includes dead times, when either the base station or the mobile station is silent.

Cellular telephone systems are presently undergoing an evolution to digital. Digital systems may overcome the drawbacks of the older AMPS services. Some of the digital wireless systems use time division multiple access ("TDMA") technology or code division multiple access ("CDMA") technology to permit multiple users to converse simultaneously on the system without interference from each other. Typical formats for TDMA transmission include those described in the interim standards IS-54B and IS-136, which are incorporated herein by reference. These standards are published by the Telecommunications Industries Association/Electronic Industries Association ("TIA/EIA"). Typical formats for CDMA transmission include those described in the ANSI/TIA/EIA-95-B-99 ("ANSI-95") standard, which is fully incorporated herein by reference. Typical CDMA systems include the "Sprint PCS" system provided by the Sprint Communications Company of Westwood, Kansas. TDMA and CDMA systems typically have increased call capacity and more efficient use of bandwidth.

In present TDMA systems, each mobile station within a sector transmits in a unique time slot and thus its signal is interleaved with signals from other mobile stations within the sector. The TDMA system typically fills a time slot corresponding to a silent periods with signals from another active mobile station, thus increasing the data transmission efficiency of the cellular network. The base stations, however, still transmit and receive on a similar group of frequencies as AMPS. Prudence still dictates that if the same frequency is used by two or more sectors, due to a limited number of available frequencies, then these sectors ought to be as far apart as possible to minimize confusing a mobile station about the identity of the base station with which it is communicating.

CDMA systems warrant similar prudence. In present CDMA systems, data modulates a noise-like carrier and spreads the spectrum over the available bandwidth. CDMA systems require less transmitter power compared to other cellular telephone systems and thus allow mobile stations to carry less battery bulk. Additionally, the spreading helps prevent interference with the signal, deliberate or otherwise, and also helps prevent the interception of calls. To intercept a call, an eavesdropper would need a precise copy of the unmodulated noise-like carrier. Typically, the noise-like carrier comprises a series of pseudo-random numbers ("PNs") generated by a computer algorithm. Given a seed, the computer algorithm generates a precise and reproducible series of numbers that appear random; a typical CDMA system requires the generation of a series with at most 256 PNs.

Each sector has a single PN for identifying itself to mobile stations. During configuration of the CDMA system, a technician may assign one of the PNs to each sector to distinguish it from the others. More typically, the technician assigns another number, a PN offset number, to the sector. The PN offset number represents where a particular PN appears in the generated series. Given the PN offset number and the seed, the sector may deduce the PN by iterating the generating algorithm. Therefore the technician typically assigns a PN offset number to each cell to identify the sector to the mobile stations.

But, similar to the drawbacks of the AMPS network, the number of sectors in a CDMA network can exceed the number of unique PN offset numbers: for example, as stated above, some CDMA systems may support a maximum of 256 PN offset numbers. Thus some PN offset numbers may be assigned to more than one sector, as was the case with frequency groups for TDMA Systems. Although each base station identifies itself with a single PN offset number rather than multiple frequencies as used in the TDMA systems, prudence again dictates that sectors with the same PN offset numbers ought to be as far apart as possible to reduce confusion at the mobile stations.

In summary, identifiers may need to be reused within the cellular wireless system, and this reuse creates problems of distributing the identifiers throughout the network. This problem exists whether the identifiers are frequencies for a TDMA system or PN offset numbers for a CDMA system. The transceivers in the cells hand-off a connection to a mobile station between the cells and between the sectors in the cells. But the ability to hand-off the call between sectors and cells requires that the identifiers must be unique for all signals at any given point in the network. Thus a technician faces the task of assigning the identifiers in such a way that the signals from different sectors with the same identifier do not interfere.

Merely assigning different identifiers to adjacent sectors may avoid some ambiguities when a mobile user is handed-off from one sector to another. Some sectors, however, may cover a large area and therefore have a large number of adjacent sectors that cover small areas. Outside these small adjacent sectors may also be other small sectors, and thus the large sector's base station may equally receive signals from many more sectors than just the adjacent sectors. The technician therefore must assign reused identifiers to sectors that are as far apart as possible to reduce interference. In the case of CDMA systems, the technician has to assign the PN offset numbers with as much space as possible between sectors with the same PN offset number.

It is therefore desirable to provide a method for assigning a set of identifiers amongst multiple sectors such that the distance between reused identifiers is sufficiently large to reduce interference between sectors.

SUMMARY OF THE INVENTION

In accordance with preferred embodiments of the present invention, some of the problems associated with allocating identifiers to sectors in a cellular wireless network are overcome. The cellular wireless network has a plurality of cells and provides cellular wireless service to a plurality of geographical regions. Each geographical region is associated with a corresponding cell of the plurality of cells and includes a base station for transmitting and receiving wireless communications to and from a mobile station. The plurality of cells further comprises a plurality of sectors, each of which is associated with an identifier chosen from a plurality of identifiers to identify itself to the mobile station. One aspect of the invention includes a method for allocating the plurality of identifiers to the plurality of sectors to reduce interference between base stations.

An exemplary method includes determining, for each sector of the plurality of sectors, a measure of neighbor density for the sector. The plurality of sectors is ranked according to the measure of neighbor density to produce a first ranking of sectors ranging from a first sector with highest neighbor density to a second sector with lowest neighbor density. For each sector of the plurality of sectors in order of the first ranking beginning with the first sector, an identifier is allocated to the sector. An exclusion range is evaluated for each sector. The exclusion range is a measure of minimal distance between the sector and other sectors having the same allocated identifier. The plurality of sectors is re-ranked according to the exclusion range to produce a new ranking of sectors ranging from a third sector with least exclusion range to a fourth sector with greatest exclusion range. During the re-ranking of the plurality of sectors, each sector of the plurality of sectors retains the identifier that was previously allocated to the sector. The identifier for each sector is reallocated in order of the new ranking beginning with the third sector. The evaluating step, the re-ranking step, and the reallocating step are repeated until each sector of the plurality of sectors retains the identifier that was previously allocated to the sector.

For example, the method of the present invention may provide a preferred assignment of PN offset numbers to the sectors of a CDMA cellular wireless network. The preferred assignment may help to assure that the cellular network does not present an ambiguity to any mobile station in the network. With the benefit of the preferred assignment, any mobile station may not receive signals of similar strength from more than one sector having a particular PN offset number. Hence the method described herein may allow the CDMA network to seamlessly hand off mobile telephones to the appropriate sector.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Figure 1:
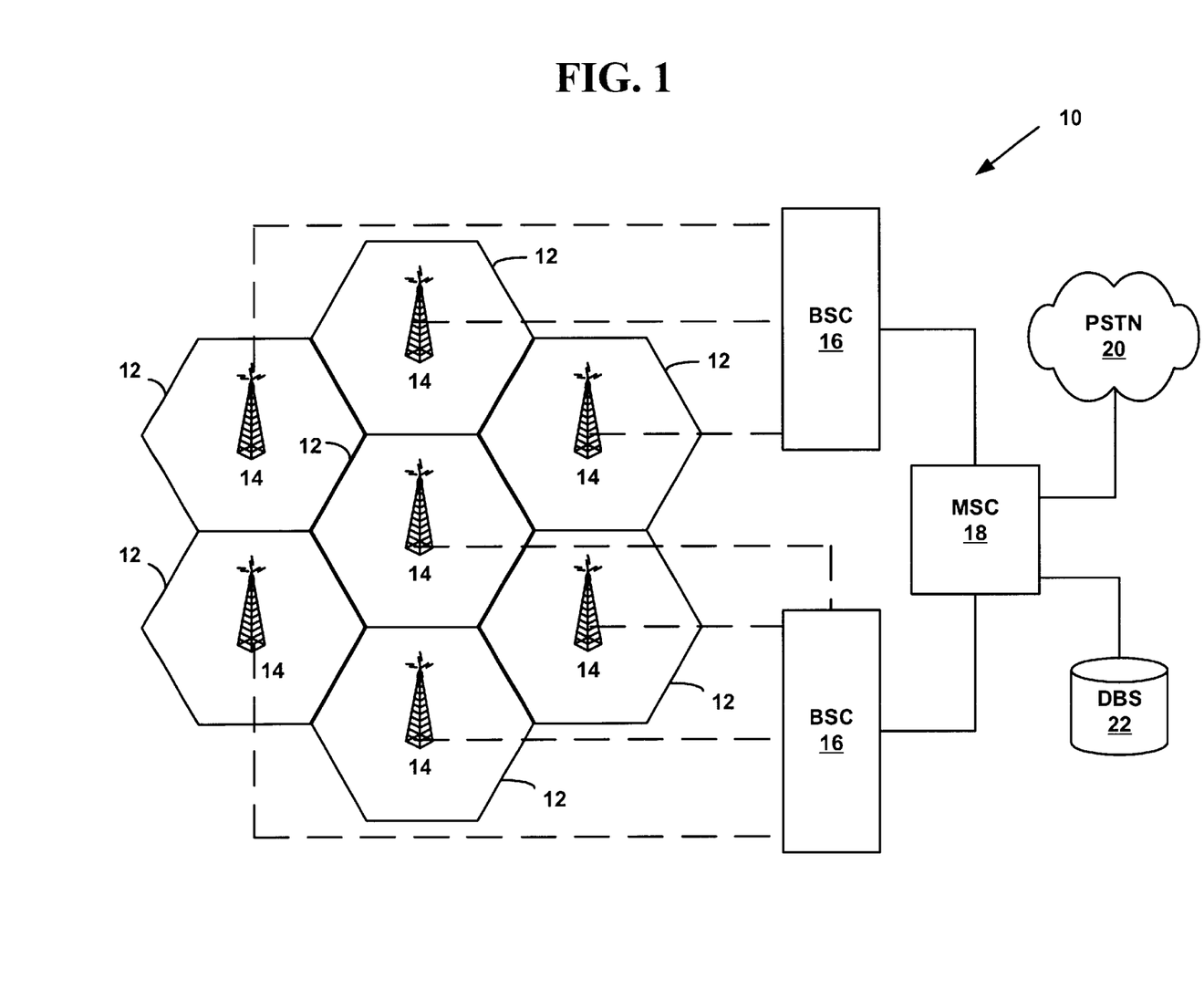
FIG. 1 is a block diagram illustrating typical components of an exemplary cellular wireless network.

FIG. 1 is a block diagram illustrating typical components of an exemplary cellular wireless system 10. The system includes multiple cells 12, each of which has a base transceiver station 14, also referred to as a base station, usually at the center of each cell 12. The base stations 14 typically transmit and receive wireless communications to and from mobile stations (not shown). In TDMA systems, each base station 14 typically communicates on a group of frequencies, and each frequency may itself carry at least one multiplexed call. Each base station 14 in a CDMA system, by comparison, communicates over a spread spectrum of frequencies, and the spectrum may carry many multiplexed calls. In a preferred embodiment, the cellular wireless system 10 is a CDMA wireless system.

The base stations 14 connect to base station controllers 16 ("BSCs") that manage handing-off the mobile station when it moves from cell 12 to cell 12. The BSCs connect to a mobile services switching center 18 ("MSC") that manages calls and routes them between a public switched telephone network 20 ("PSTN") and the appropriate cell 12. The MSC 18 also maintains databases 22 ("DBS") that store customer and system information. The MSC's tasks include authenticating and registering mobile stations on the system 10, and processing account information for customers. It should be understood, however, that the preferred embodiments are not restricted to the cellular wireless system 10 depicted in FIG. 1 and that other components and configurations may support the methods described herein.

Figure 2:
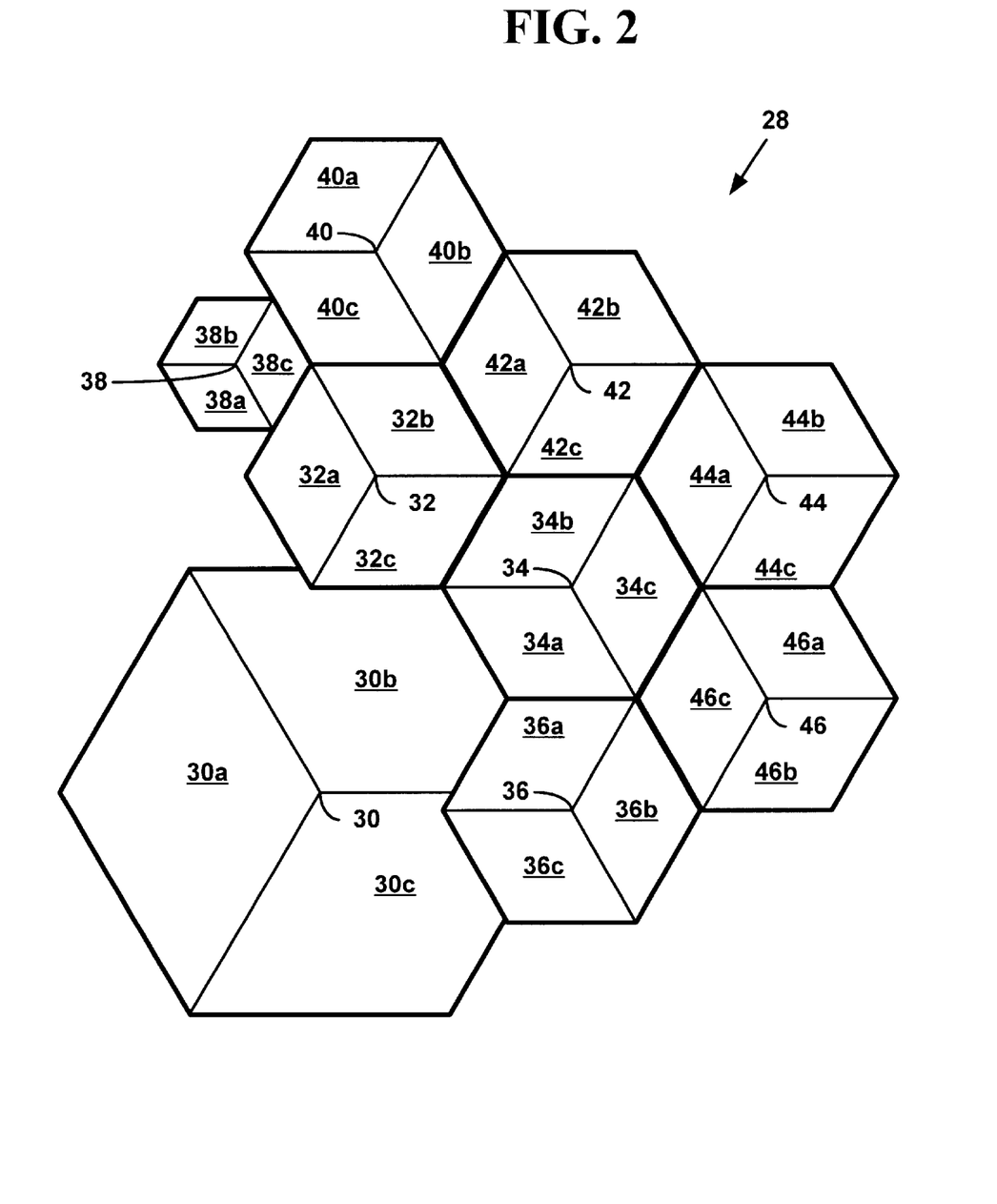
FIG. 2 is a schematic diagram illustrating an exemplary distribution of cells that provide cellular wireless service to a geographical area.

FIG. 2 is a schematic diagram illustrating an exemplary network 28 of cells that provide cellular wireless service to a geographical area. In this exemplary distribution, each cell is divided into three sectors with a base station 30–46 roughly in the center of the cell. Each sector of a cell is identified with either an "a," "b," or "c" appended to the number identifying the base station 30–46. For the purposes of illustrating that cells may provide coverage to geographically diverse regions, the cell with sectors 30a–30c is shown as larger than other cells, while the cell with sectors 38a–38c is shown as smaller than other cells; sectors 38a–38c may cover a region with a high number of cellular customers, while sectors 30a to 30c may cover a region with a low number of cellular customers. Additionally, as is apparent to one of ordinary skill in the art, the network 28 is illustrated in an idealized fashion. For example, while borders are shown between the wireless coverage regions 30a–46c in FIG. 2, typically the wireless coverage areas overlap. At many sites in the network 28, a mobile station may communicate with more than one base station 30–46. Therefore, it should be understood that the distribution, shape, and size of the sectors 30a–46c of FIG. 2 are for illustrative purposes only and are not meant to convey a preferred arrangement of cells in the network 28.

Identifiers for Sectors in the Network

Typically, a CDMA system 10 assigns a PN offset number to each sector 30a–46c in the network 28 to identify the base station 30–46 and the sector 30a–46c within the cell. As there are typically between eighty-five and one-hundred-seventy PN offset numbers available to cover five hundred or more sectors 30a–46c in the network 28, the system 10 may reuse some or all of the PN offset numbers. Similarly, in a TDMA or AMPS system, a particular number of frequency groups have to be assigned to a smaller number of sectors 30a–46c. Again, some or all of the frequency groups may have to be reused in more than one sector 30a–46c. In the preferred embodiments, the reused identifiers are PN offset numbers assigned to the sectors 30a–46c of the preferred CDMA cellular wireless network 28. However, it should be understood that the methods described herein are not restricted for use in CDMA systems 10 but may also be used in other cellular wireless systems 10 such as TDMA or AMPS systems.

Indiscriminately reusing PN offset numbers or other such identifiers, however, may have some pitfalls. First, if two adjacent sectors 30a–46c have the same identifier, a mobile station may monitor both sectors and fail a hand-off to the correct neighboring sector. Typically, each sector 30a–46c in the network 28 has an associated list of neighboring sectors 30a–46c. The neighbor list for each sector 30a–46c may be stored in the databases 22 and is accessible by the MSC 18. When a mobile station is within the coverage area of a sector 30a–46c, the base station 30–46 for the sector 30a–46c typically sends a copy of its neighbor list to the mobile station. The mobile station then monitors signals from the base stations 30–46 whose identifiers are included in the neighbor list. For example, the neighbor list for sector 32b may include the identifiers for immediate neighbors such as sectors 32a, 32c, 40c, and 42a. The neighbor list for sector 32b may also include identifiers for other surrounding neighbors such as sectors 38c, 40b, 42c, and 34b. If sector 32c were assigned the same reused identifier as sector 32b, a mobile station in sector 32c may obtain the neighbor list for sector 32b by mistake. When the mobile station moves from sector 32c to sector 30b, for example, the hand-off may fail because the identifier for sector 30b may not be in the neighbor list of sector 32b.

Second, assigning the same identifier to surrounding, but not adjacent, sectors 30a–46c may present the mobile station with a similar ambiguity. The mobile station may have a line-of-sight propagation path from its current position to the base station 30–46 of a non-adjacent neighbor but have an obstacle in the path to the closest base station 30–46. Radio propagation conditions may allow the mobile station to receive signals from the non-adjacent neighbor with strength comparable to signals from its present sector 30a–46c. Also, as illustrated in FIG. 2, the density of neighboring sectors 30a–46c may vary throughout the network 28. In some densely packed portions of the network 28, such as around sector 38c, many identifiers may already be assigned to sectors 30a–46c within a small geographical area and so radio signals need not have far to propagate from non-adjacent sectors 30a–46c. Again, the mobile station may obtain the wrong neighbor list from the MSC 18.

Third, as more customers subscribe to a cellular service 10, new sectors 30a–46c may need to be added to the network 28 and assigned an identifier. If the new sector 30a–46c is added to a densely packed portion of the network 28, it may be difficult to find an identifier that has not already been assigned to a neighboring sector 30a–46c. The addition of new sectors 30a–46c may therefore vitiate a satisfactory assignment of identifiers.

Maximizing the distance between reused identifiers may solve the above problems. Maximizing the distance between sectors 30a–46c that reuse identical identifiers may minimize the risk of interference between the base stations 30–46 of adjacent and surrounding neighbors in the CDMA network 28. Additionally, maximizing the distance between reused identifiers may provide for the easier introduction of new sectors 30a–46c into the network 28.

Method for Allocating Identifiers to Sectors

Figure 3A:
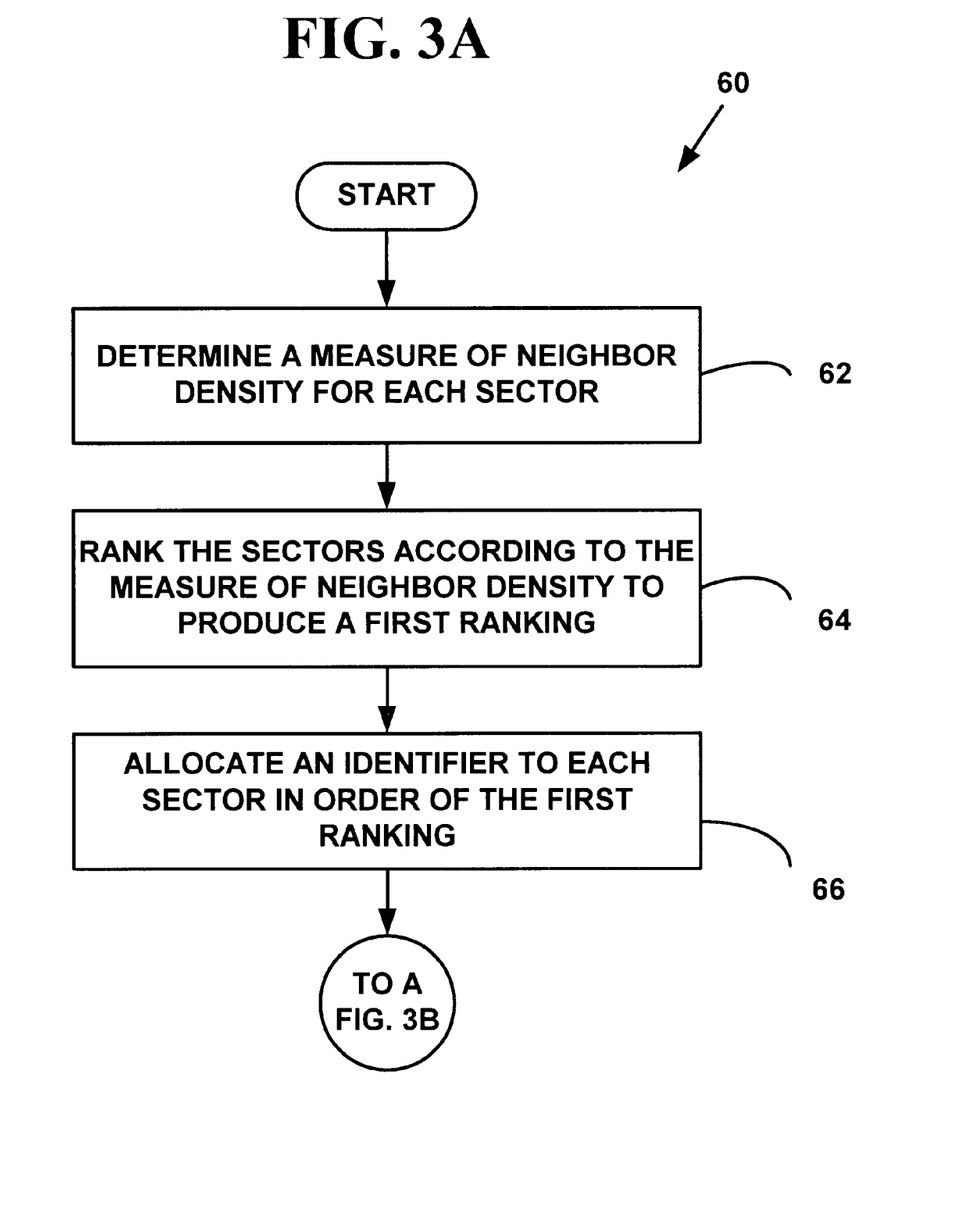
FIG. 3 is a flow diagram illustrating a preferred method for allocating multiple identifiers to multiple sectors in the cellular wireless network of FIG. 2 to reduce interference between base stations.
Figure 3B:
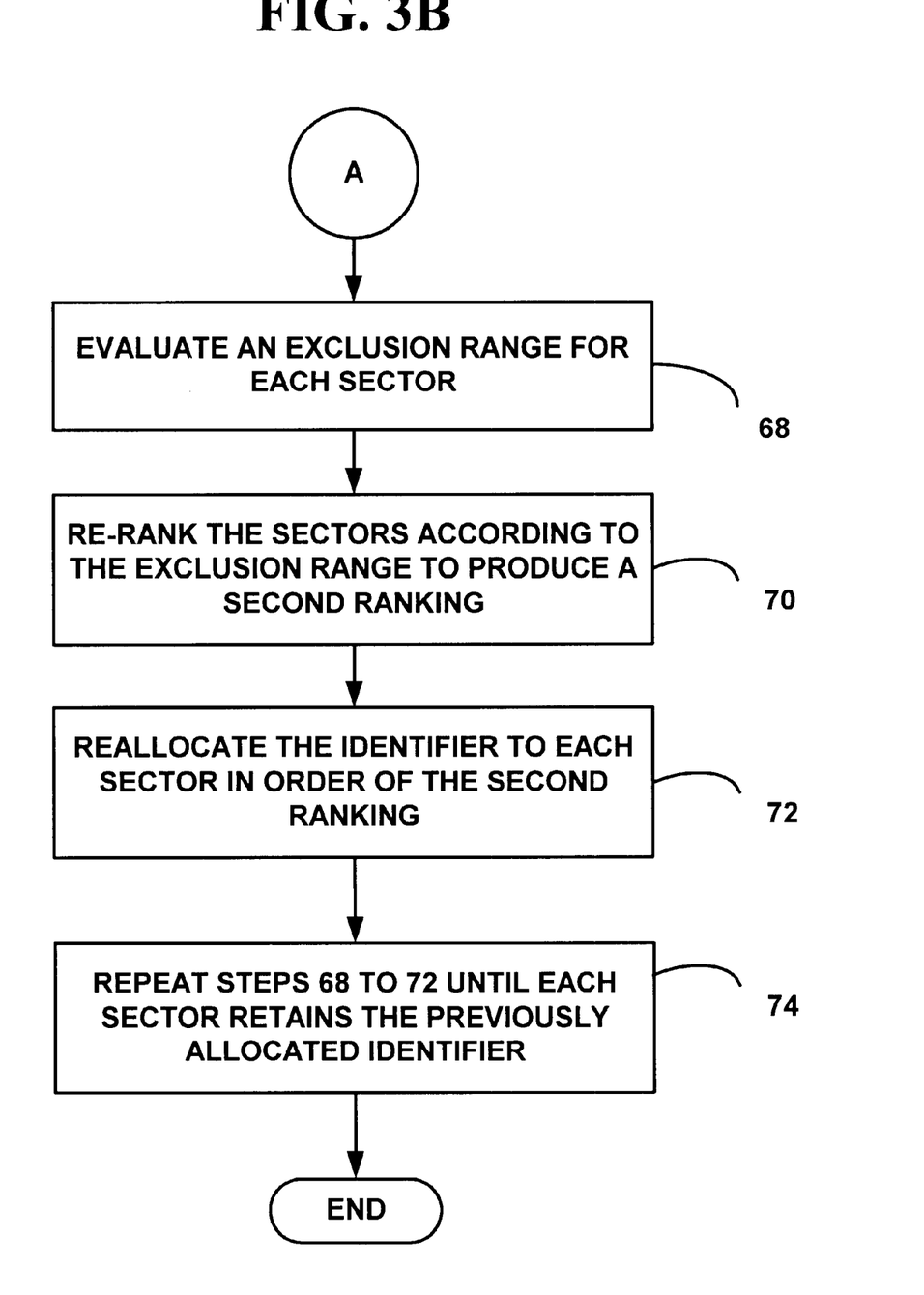

FIG. 3 is a flow diagram illustrating a preferred method 60 for allocating multiple identifiers to multiple sectors 30a–46c in the cellular wireless network 28 of FIG. 2 to reduce interference between base stations 30–46. At step 62, the method 60 determines a measure of neighbor density for each sector 30a–46c. At step 64, the method 60 ranks the multiple sectors 30a–46c by the measure of neighbor density. This ranking produces a first ranking of sectors 30a–46c, which range from a first sector with highest neighbor density to a last sector with lowest neighbor density. Each sector 30a–46c is allocated an identifier at step 66. The allocation is done in order of the first ranking, beginning with the first sector of the first ranking and ending with the last sector of the first ranking.

As indicated above, the identifiers may be PN offset numbers for a CDMA system 10 as described above, or the identifiers may be frequency groupings for TDMA systems 10. It should be understood that the present invention is not restricted to allocating PN offset numbers of frequency groupings, and that the method 60 may assign other types of identifiers to the sectors 30a–46c of other cellular wireless networks 28.

After allocating the identifiers, the method 60 evaluates an exclusion range for each sector 30a–46c at step 68. The exclusion range for a sector 30a–46c is a measure of minimal distance between this sector 30a–46c and other sectors 30a–46c that share the allocated identifier. At step 70, the multiple sectors 30a–46c are re-ranked according to their exclusion ranges to produce a new ranking of sectors 30a–46c ranging from a third sector with least exclusion range to a fourth sector with greatest exclusion range. During the re-ranking, each sector 30a–46c retains the identifier that was previously allocated to it. In order of the new ranking beginning with the third sector and ending with the fourth sector, the method 60 reallocates the identifier to each sector 30a–46c at step 72.

The evaluating step 68, the re-ranking step 70, and the reallocating step 72 are repeated at step 74 until each sector 30a–46c retains its previously allocated identifier. In this manner, sectors 30a–46c sharing the same identifier may be as far apart as possible, thus reducing interference between base stations 30–46 and improving the quality of hand-offs.

In accordance with the practices of persons skilled in the art of computer programming, a preferred embodiment of the present invention is as symbolic representations of operations or instructions that are performed by a computer processing system. Such acts and operations or instructions may be referred to as being "computer-executed" or "CPU executed." An operating environment for the preferred embodiments includes a processing system with at least one Central Processing Unit ("CPU") and a memory.

A person of ordinary skill in the art will appreciate that the acts and symbolically represented operations or instructions described herein include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, or optical properties corresponding to of representative of the data bits. Examples of computing platforms that may support the preferred embodiments include a Windows or Macintosh platform running Visual Basic. However, it should be understood that the preferred embodiments are not limited to the above-mentioned platforms or CPUs and that other platforms and CPUs may support the described methods.

Determining the Measure of Neighbor Density

The first three steps 62–66 of the method 60 preferentially allocate identifiers to sectors 30a–46c that are in more densely packed regions of the network 28. In the prior art, the task of choosing an unused identifier for another sector 30a–46c in the region became more difficult as each sector in a densely packed region received an identifier. The pool of unused identifiers typically shrank rapidly, thus leaving the technician with no choice but to allocate the same identifier more than once in the same region. Such an allocation may introduce interference between the base stations 30–46 in the region. To prevent such interference, the method 60 allocates identifiers to the sectors 30a–46c in the more densely packed regions before allocating identities to other sectors 30a–46c, to increase the probability that the identifiers are different from each other. The method 60 therefore preferentially allocates any identifiers that are reused to sectors 30a–46c in less densely packed regions where they may cause less interference.

To help identify densely packed regions, the method 60 determines a measure of neighbor density for each sector 30a–46c at step 62. The measure of neighbor density is typically a number that provides a qualitative estimate of clustering in the vicinity of each sector 30a–46c in the wireless network 28. If a sector 30a–46c has a large measure of neighbor density, then it is more likely to be in a densely packed region of the network 28.

One preferred measure of neighbor density is a count of how many sectors 30a–46c are within a specified geographical area centered on the base station for the sector 30a–46c. While this measure has the advantage of being readily determinable from a geographical map of the network 28, it may not be representative of the wireless coverage area of the sectors 30a–46c. Some sectors 30a–46c may propagate signals beyond the idealized cells of FIG. 2, as discussed above.

Figure 4:
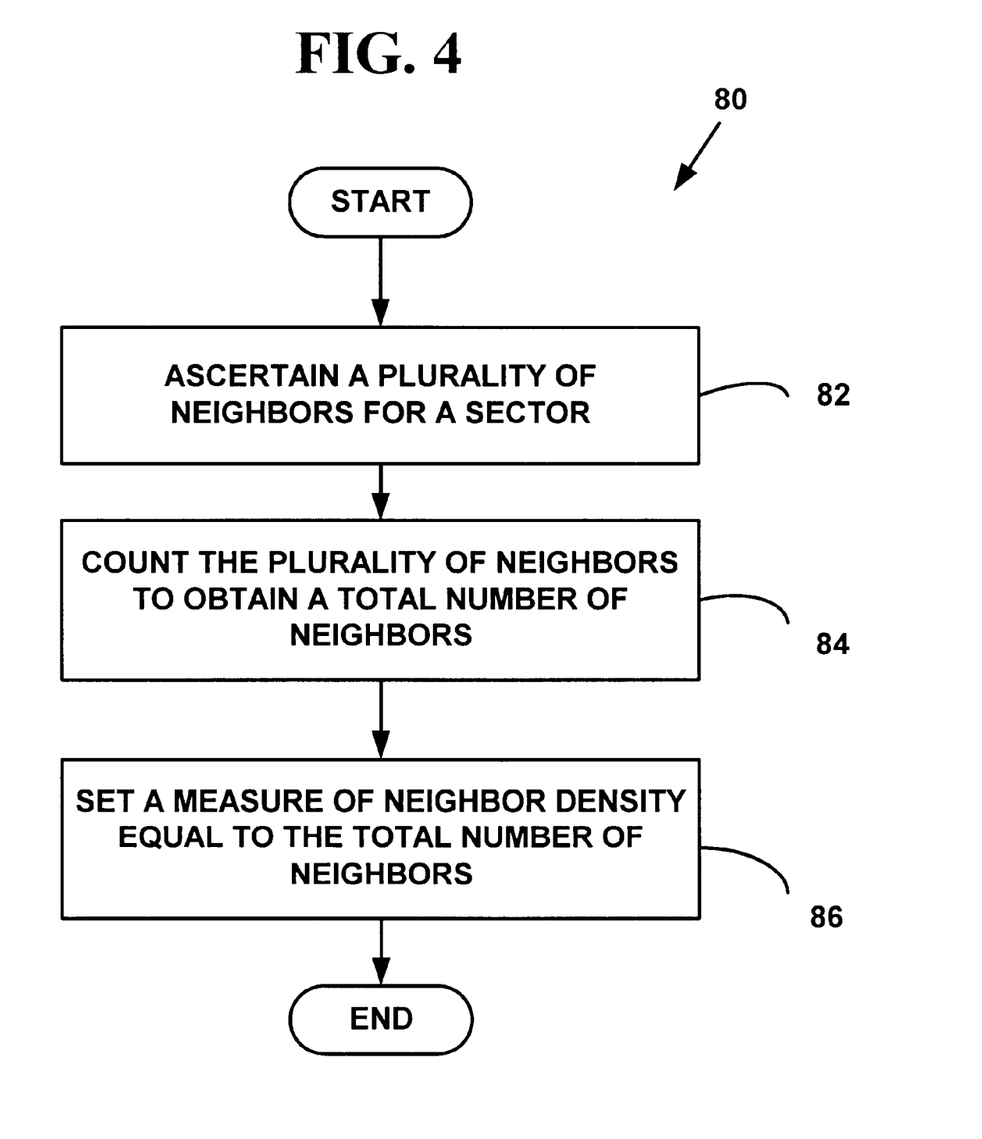
FIG. 4 is a flow diagram illustrating a preferred method for determining the neighbor density of each sector at step 62 of FIG. 3.

An alternative preferred measure of neighbor density for a sector 30a–46c is a count how many sectors 30a–46c may be considered neighbors of the sector 30a–46c to within a certain depth. FIG. 4 is a flow diagram illustrating a preferred method 80 for determining the neighbor density of the sector 30a–46c. At step 82, the method 80 ascertains a plurality of neighbors for the sector 30a–46c. Each neighbor of the plurality of neighbors is no more than a minimum number of sectors 30a–46c away from the sector 30a–46c under consideration. Having ascertained the neighbors, the method 80 counts the plurality of neighbors to obtain a total number of neighbors at step 84. The measure of neighbor density is set equal to this total number of neighbors at step 86. In this manner, the method 80 determines a measure of neighbor density for each sector 30a–46c in the network 28, thus helping identify tightly packed regions in the network 28.

As an example, the minimum number of sectors 30a–46c away is three. For example, with reference to FIG. 2, the immediate neighbors of sector 32b are the four sectors 32a, 32c, 40c, and 42a. These sectors may be considered to be one sector away, or one sector deep, from sector 32b because going from the sector to these neighbors requires crossing one border between the sectors. In this example, sectors whose vertices touch, such as sectors 32b and 34b, are not considered to be neighbors. Similarly, the sectors that are two sectors away, or two sectors deep, from sector 32b include the seven sectors 30b, 34b, 38c, 40a, 40b, 42b, and 42c because it requires crossing two borders. Continuing this process, the sectors that are three sectors away, or three sectors deep, from sector 32b, or neighbors include the eight sectors 30a, 30c, 34a, 34c, 36a, 38a, 38b, and 44a. Thus, from this example, the plurality of sectors that are three neighbors deep to sector 32b, or three neighbors away from sector 32b, includes the nineteen sectors listed above.

In yet another alternative preferred method, the method 80 examines a neighbor list for the sector 30a–46c, and retains only those sectors 30a–46c that are no more than the minimum numbers of sectors 30a–46c away. Typically, the neighbor list for each sector 30a–46c also records the depth of the neighbors. By examining the depth attributed to the neighbor, the method 80 may reject all neighbors that are more than a minimum number of sectors 30a–46c away. Therefore, the method 80 examines the neighbor list for the sector and retains only those neighbors that are recorded as having no more than a minimum depth, such as three, from sector 32b. In the example described above, the method 80 would examine the neighbor list of sector 32b and only retain the nineteen sectors that are no more than three sectors 30a–46c away from sector 32b.

Having ascertained the neighbors, the method 80 counts the plurality of neighbors to obtain a total number of neighbors, at step 84 of the method 80. In the above example, for instance, counting the sectors 30a–46c that are no more than three sectors away from sector 32b yields a count of nineteen as the total number of neighbors. The measure of neighbor density is set equal to this total number of neighbors for sector 32b at step 86. In this manner, the method 80 determines a measure of neighbor density for each sector 30a–46c in the network 28, thus helping identify tightly packed regions in the network 28.

It should be understood, however, that the preferred methods for determining the measure of neighbor density are not limited to the method 80 of FIG. 4, a maximum depth of three, or the use of neighbor lists. Many more measures of neighbor density, maximum depths, and information on the configuration of the network 28 are possible.

Allocating Identifiers to the Sectors

With reference to FIG. 3, upon determining the measure of neighbor density for each sector 30a–46c at step 62, the method 60 ranks the sectors 30a–46c in order of the measure of neighbor density. At one end of the ranking will be a sector 30a–46c that is in a most densely packed region of the network 28; at the other end of the ranking will be a sector 30a–46c that is in a most sparsely packed region of the network 28. At step 66, the method 60 allocates an identifier to each sector in order of the ranking, beginning with the sector 30a–46c in the most densely packed region of the network 28. The least restrictive sectors 30a–46c, as far as allocation is concerned, are the sectors 30a–46c with a low measure of neighbor density, and it is therefore safer to reuse identifiers in these sectors 30a–46c. In this manner, the more densely packed sectors 30a–46c preferentially receive distinct identifiers, and any reuse of identifiers is preferably consigned to more sparser regions of the network 28 where they may cause less interference.

Figure 5:
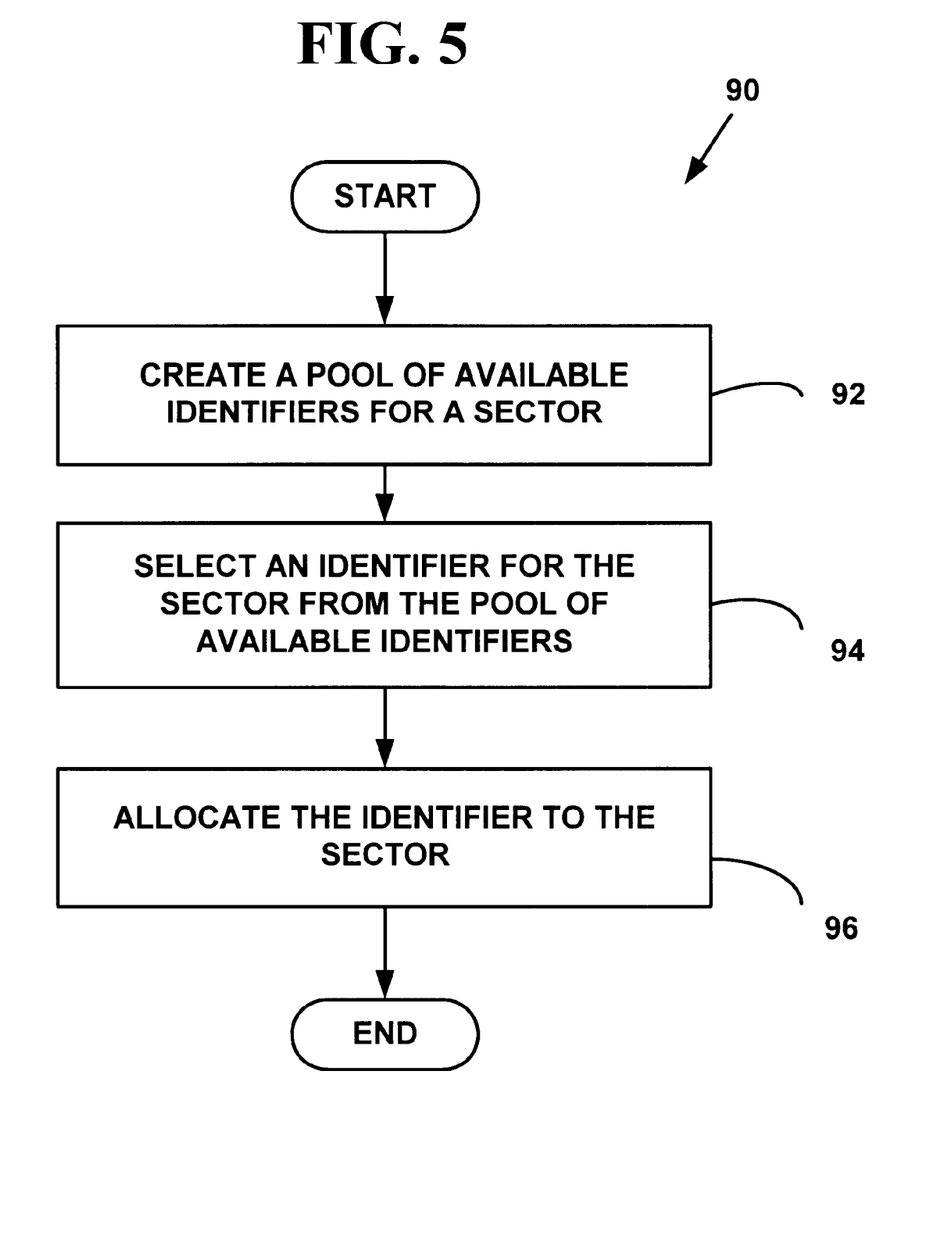
FIG. 5 is a flow diagram illustrating a preferred method for allocating the identifiers to the sectors at step 66 of FIG. 3.

At step 66, the method 60 allocates an identifier to each sector 30a–46c in order of the ranking. FIG. 5 is a flow diagram illustrating a preferred method 90 for allocating an identifier to a sector 30a–46c in the order. At step 92, when allocating an identifier to the sector 30a–46c, the method 90 creates a pool of available identifiers for the sector 30a–46c. The method 90 selects the identifier for the sector 30a–46c from the pool of available identifiers at step 94. At step 96, the method allocates this selected identifier to the sector 30a–46c. Preferentially, the allocation method 90 creates the pool of available identifiers by eliminating those identifiers that may have a reuse problem. One preferred embodiment of step 92 eliminates, for example, all identifiers that are reserved from the pool. Examples of reserved identifiers include those specially used for temporary cells or those for high base stations 30–46 that propagate far outside the borders of their cells. A technician may reserve identifiers for other reasons, however, and the preferred allocation method 90 is not restricted to identifiers associated with temporary or high cells. Thus the allocation method 90 avoids allocating any identifiers that may later cause interference or need to be used for special purposes.

Another preferred embodiment of step 92, for example, eliminates all identifiers from the pool that were previously allocated to a neighboring sector. As the allocation method 60 allocates identifiers to sectors 30a–46c, there is an increasing chance that a neighbor has already been allocated an identifier. To avoid problems arising from allocating the same identifier to two or more neighboring sectors, step 92 determines if any neighboring sector has been allocated an identifier, and, if so, eliminates that identifier from the pool. Preferably, step 92 examines neighboring sectors that are at most three sectors 30a–46c away from the sector 30a–46c for which the pool of available identifiers is being created. As the method 60 allocates identifiers to sectors 30a–46c in order of their decreasing neighborhood density, this preferred embodiment might therefore reduce the likelihood that the same identifier appears in densely packed regions of the network 28.

Yet another preferred embodiment of step 92 eliminates all identifiers from the pool that have been allocated to more than a minimum number of sectors 30a–46c. As the method 60 allocates identifiers to sectors 30a–46c, it may allocate some identifiers more times than others. Allocating some identifiers more times than others may increase the likelihood that the method 60 is not allocating reused identifiers to sectors 30a–46c that are as far apart as desired. Therefore, step 92 may attempt to flatten the distribution of identifiers allocated to the network 28. For example, step 92 may maintain a tally of how many times each identifier has been allocated to a sector 30a–46c. In this embodiment of step 92, the allocation method 90 eliminates any identifiers from the pool that have been allocated more than a minimum number of times. Preferably, from experience with typical cellular wireless networks, the minimum number of times is three. Thus this preferred embodiment of step 92 removes identifiers that the method 60 may allocate more often than usual.

A preferred sequence of eliminating identifiers from the pool of available identifiers is: (i) eliminating the reserved identifiers; (ii) eliminating all identifiers that were previously allocated to a neighboring sector 30a–46c; and (iii) eliminating all identifiers that have been allocated to more than a minimum number of sectors 30a–46c. However, the present allocating method 90 is not restricted to this sequence; the allocation method 90 may involve more or fewer eliminating steps, and may perform the steps in a different order than described above.

Having preferably eliminated most or all identifiers that may create problems, the allocation method 90 next selects an identifier from the remaining pool of available identifiers, at step 94. In one preferred embodiment of step 94, the selection step 94 associates a reuse range with each available identifier in the pool and selects the identifier associated with greatest reuse range. The reuse range is a measure of minimal distance between two sectors 30a–46c that share the available identifier. For example, for each available identifier, step 94 may examine the network to determine whether this identifier has already been allocated to more than one sector 30a–46c. If it has already been allocated to more than one such sector 30a–46c, step 94 may determine what distances these sectors 30a–46c are from each other. One example of the distance is the geographical length, measured in kilometers or miles, between the base stations 30–46 for the sectors 30a–46c; another example is the number of sectors 30a–46c, between the sectors 30a–46c with the same identifier. Step 94 may then ascertain the minimum of these distances, which becomes the reuse range associated with the identifier. In this preferred embodiment, step 94 examines the reuse range for each of the available identifiers in the pool, and determines which available identifier is associated with the greatest reuse range. The allocating method 90 selects this identifier because it may increase the likelihood that the same identifier is reused in sectors 30a–46c that are as far apart as possible. If there is more than one available identifier associated with the greatest reuse range, however, the allocating method 90 selects one of them randomly. In this manner, the allocating method 90 allocates an identifier to each sector 30a–46c in the network 28 but attempts to keep reused identifiers as many sectors 30a–46c away from each other as possible.

Evaluating the Exclusion Range

After allocating the identifiers at step 66 as described above, the method 60 of FIG. 3 evaluates an exclusion range for each sector 30a–46c at step 68. For any given sector 30a–46c, the exclusion range is a measure of minimal distance between the given sector 30a–46c and any other sectors 30a–46c that share the same identifier. For example, for any given sector having an identifier, step 68 may determine to what other sectors 30a–46c this identifier has already been allocated. Step 68 may then determine what distances these other sectors 30a–46c are from the given sector 30a–46c. One example of each distance is the geographical length, measured in kilometers or miles, between the base station 30–46 for the given sector 30a–46c and the other sector 30a–46c having the same identifier. Another example of each distance is the number of sectors 30a–46c, between the given sector 30a–46c and the other sector 30a–46c. Step 68 may then ascertain the minimum of these distances, which becomes the exclusion range associated with the given sector 30a–46c. Thus step 68 may identify sectors 30a–46c having the same identifier that are near enough to each other to cause interference between their signals.

After evaluating the exclusion range for each sector 30a–46c, and determining which sectors 30a–46c may be too close together to share the same identifiers, the method 60 re-ranks the sectors 30a–46c in order of the exclusion range at step 70. At one end of this new ranking will be a sector 30a–46c with least exclusion range that steps 62–68 may have identified as being the most restrictive sector 30a–46c in terms of allocating an identifier without fear of interference. At the other end of the ranking will be a sector 30a–46c with the greatest exclusion range that steps 62–68 may have identified as being the least restrictive sector 30a–46c in terms of allocating the identifier. Thus the sectors 30a–46c of the new ranking may be in order of the difficulty of allocating identifiers to them.

At step 72, having established the new ranking, the method 60 reallocates the identifiers to each sector 30a–46c in order of the new ranking, beginning with the sector 30a–46c having the least exclusion range. The least restrictive sectors 30a–46c, as far as reallocation is concerned, are the sectors 30a–46c with a high exclusion range, and it is therefore safer to reuse identifiers in these sectors 30a–46c. In this manner, the more problematic sectors 30a–46c preferentially receive distinct identifiers, and any reuse of identifiers is consigned to less problematic sectors 30a–46c in the network 28 where they may cause less interference.

At step 72, the method 60 may perform the reallocation of the identifiers in the same manner as it performed the prior allocation of identifiers at step 66. In accordance with the above description of the allocating step 66, a preferred method for reallocating identifiers may be to create a pool of available identifiers for the sector 30a–46c, select an identifier for the sector 30a–46c from the pool, and allocate this selected identifier to the sector 30a–46c. Also in accordance with the above description of the allocating step 66, creating the pool of available identifiers may include eliminating certain identifiers from the pool. Such eliminated identifiers may include reserved identifiers, identifiers that were previously allocated to a neighboring sector 30a–46c, and identifiers that have been allocated to more than a minimum number of sectors 30a–46c. Also in further accordance with the above description of the allocating step 66, selecting the identifier from the pool may also entail associating a reuse range with each available identifier in the pool and selecting the identifier associated with greatest reuse range. Thus the reallocation of the identifiers may result in a distribution of identifiers to the sectors 30a–46c of the network 28 that maximizes the distance between reused identifiers.

Repeating the Reallocation

At step 74, the method 60 iteratively repeats steps 68 to 72 until each sector 30a–46c retains the identifier that was allocated to it in the previous iteration. At step 68, the method 60 again evaluates the exclusion range for each sector 30a–46c and identifies potentially problematic sectors 30a–46c with the same identifier that may be close enough to cause interference. The method 60 then ranks the sectors 30a–46c again in order of the exclusion range at step 70. At step 72, the method 60 performs another allocation of the identifiers to each sector 30a–46c in order of the latest ranking, beginning with the sector 30a–46c having the least exclusion range. In accordance with the allocating step 66 and the reallocating step 72, this latest allocation may create a pool of available identifiers for the sector 30a–46c, select an identifier for the sector 30a–46c from the pool, and allocate this selected identifier to the sector 30a–46c. Repeating steps 68 to 72 may allow the method 60 to allocate identifiers to the sectors 30a–46c in such a way that, in the resulting distribution of identifiers, the distance between reused identifiers is sufficiently large to reduce interference between sectors 30a–46c.

The method 60 repeats steps 68 to 72 until each sector 30a–46c retains the identifier that the method 60 had allocated at the previous reallocating step 72. When the distribution of identifiers throughout the network 28 is unchanged after repeating steps 68 to 72, the method 60 may have attained an optimal distance between reused identifiers. Thus the stable distribution may be the best allocation of identifiers to sectors 30a–46c that reduces interference in the cellular wireless system 10.

It should be understood that the programs, methods, systems, and apparatus described herein are not related or limited to any particular type of computer apparatus (hardware or software) or cellular wireless network, unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or components may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method for allocating a plurality of identifiers to a plurality of sectors of a cellular wireless network to reduce interference between base stations for the sectors, the method comprising the steps of:
   (a) determining a measure of neighbor density for each sector;
   (b) ranking the plurality of sectors according to the measure of neighbor density to produce a first rank order of sectors;
   (c) allocating identifiers to sectors in the first rank order, beginning with a highest ranked sector in the first rank order;
   (d) evaluating an exclusion range for each sector, the exclusion range being a measure of minimal distance between the sector, the sector having an allocated identifier, and other sectors also having the allocated identifier;
   (e) ranking the plurality of sectors that have a determined exclusion range to produce a second rank order of sectors in order of their determined exclusion range, wherein each sector retains the identifier that was previously allocated to the sector;
   (f) allocating identifiers to the sectors in the second rank order, beginning with lowest ranked sector in the second rank order; and
   repeating steps (d), (e), and (f) until each sector of the plurality of sectors retains the identifier that was previously allocated to the sector.

2. A computer readable medium having stored therein instructions for causing a central processing unit to execute the method of claim 1.

3. The method of claim 1 wherein step (c) or step (f) comprises the steps of:
   creating a pool of available identifiers for the sector;
   selecting the identifier for the sector from the pool of available identifiers; and
   allocating the identifier to the sector.

4. The method of claim 3 wherein the creating step comprises:
   eliminating a first selection of identifiers from the plurality of identifiers to create the pool of available identifiers for the sector, wherein each identifier of the first selection of identifiers was previously allocated to a neighboring sector.

5. The method of claim 4 wherein the neighboring sector is at most three sectors away from the sector.

6. The method of claim 3 wherein the creating step comprises:
   eliminating a second selection of identifiers from the plurality of identifiers to create the pool of available identifiers for the sector, wherein each identifier of the second selection of identifiers has been allocated to more than a minimum number of sectors.

7. The method of claim 6 wherein the minimum number of sectors is three.

8. The method of claim 3 wherein the creating step comprises:
   eliminating a third selection of identifiers from the plurality of identifiers to create the pool of available identifiers for the sector, wherein each identifier of the third selection of identifiers is reserved.

9. The method of claim 3 wherein the selecting step comprises the steps of:
   associating, for each available identifier in the pool of available identifiers for the sector, a reuse range with the available identifier, wherein the reuse range is a measure of minimal distance between two sectors that share the available identifier; and
   selecting the available identifier that is associated with greatest reuse range.

10. The method of claim 3 wherein the selecting step comprises the steps of:
    associating, for each available identifier in the pool of available identifiers for the sector, a reuse range with the available identifier, wherein the reuse range is a measure of minimal distance between two sectors that share the available identifier; and
    determining whether there are more than one available identifiers that are associated with greatest reuse range, and if so,
       selecting the identifier randomly from the more than one available identifiers that are associated with greatest reuse range.

11. The method of claim 1 wherein step (a) comprises the steps of:
    ascertaining a plurality of neighbors for the sector, wherein each neighbor of the plurality of neighbors is no more than a minimum number of sectors away from the sector;
    counting the plurality of neighbors to obtain a total number of neighbors; and
    setting the measure of neighbor density equal to the total number of neighbors.

12. The method of claim 11 wherein the ascertaining step comprises the steps of:
    examining a neighbor list for the sector; and
    retaining the plurality of sectors that are no more than the minimum number of sectors away from the sector.

13. The method of claim 11 wherein the minimum number of sectors is three.

14. The method of claim 1 wherein step (d) comprises:
    determining, for each other sector of the plurality of sectors, whether the other sector shares the identifier with the sector, and if so,
       estimating a distance from the other sector to the sector, and
       determining whether the distance is a minimum distance, and if so,
          setting the exclusion range equal to the minimum distance.

15. The method of claim 1 wherein the cellular wireless network is a Code Division Multiple Access cellular wireless system and the plurality of identifiers is a plurality of pseudo-random offset numbers.

16. The method of claim 1 wherein the cellular wireless network is a Time Division Multiple Access cellular wireless system and the plurality of identifiers is a plurality of frequency groups.

17. A method for allocating a plurality of pseudo-random offset numbers to a plurality of sectors of a Code Division Multiple Access cellular wireless network to reduce interference between base stations for the sectors, the method comprising the steps of:
    (a) ascertaining a plurality of neighbors for each sector, wherein each neighbor of the plurality of neighbors is no more than three sectors away from the sector;

(b) counting the plurality of neighbors to obtain a total number of neighbors;

(c) setting a measure of neighbor density equal to the total number of neighbors;

(d) ranking the plurality of sectors according to the measure of neighbor density to produce a first rank order of sectors;

(e) allocating pseudo-random offset numbers to sectors in the first rank order, beginning with a highest ranked sector in the first rank order;

(f) evaluating an exclusion range for each sector, the exclusion range being a measure of minimal distance between the sector, the sector having an allocated pseudo-random offset number, and other sectors also having the allocated pseudo-random offset number;

(g) ranking the plurality of sectors that have a determined exclusion range to produce a second rank order of sectors in order of their determined exclusion range, wherein each sector retains the pseudo-random offset number that was previously allocated to the sector;

(h) allocating pseudo-random offset numbers to the sectors in the second rank order, beginning with lowest ranked sector in the second rank order; and repeating steps (f), (g), and (h) until each sector of the plurality of sectors retains the pseudo-random offset number that was previously allocated to the sector.

18. A computer readable medium having stored therein instructions for causing a central processing unit to execute the method of claim 17.

19. The method of claim 17 wherein step (e) or step (h) comprises the steps of:

eliminating a first selection of pseudo-random offset numbers from the plurality of pseudo-random offset numbers to create a first pool of available pseudo-random offset numbers for the sector, wherein each pseudo-random offset number of the first selection of pseudo-random offset numbers is reserved;

eliminating a second selection of pseudo-random offset numbers from the plurality of pseudo-random offset numbers from the first pool to create a second pool of available pseudo-random offset numbers for the sector, wherein each pseudo-random offset number of the second selection of pseudo-random offset numbers was previously allocated to a neighboring sector;

eliminating a third selection of pseudo-random offset numbers from the plurality of pseudo-random offset numbers from the second pool to create a third pool of available pseudo-random offset numbers for the sector, wherein each pseudo-random offset number of the third selection of pseudo-random offset numbers has been allocated to more than a minimum number of sectors;

associating, for each available pseudo-random offset number in the third pool of available pseudo-random offset numbers for the sector, a reuse range with the available pseudo-random offset number, wherein the reuse range is a measure of minimal distance between two sectors that share the available pseudo-random offset number; and selecting the available pseudo-random offset number that is associated with greatest reuse range.

* * * * *